May 14, 1929. M. K. PARKHURST 1,713,239
TOOL MAKER'S CLAMP
Filed Nov. 3, 1927
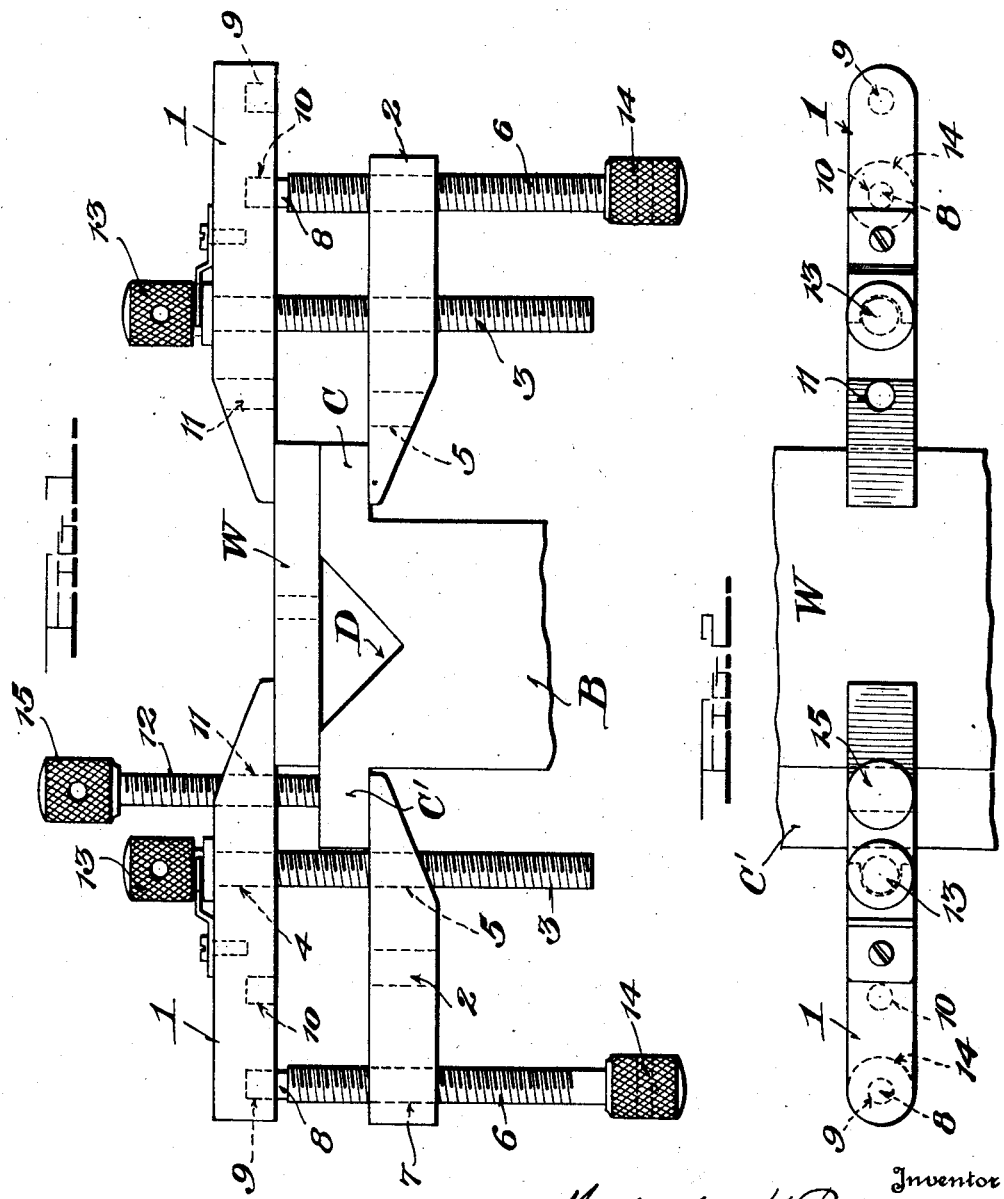
Inventor
Malcolm K. Parkhurst
By Joseph H. Miller
Attorney Patented May 14, 1929.

1,713,239

UNITED STATES PATENT OFFICE.

MALCOLM K. PARKHURST, OF NEW YORK, N. Y., ASSIGNOR TO BROWN & SHARPE MFG. CO., OF PROVIDENCE, RHODE ISLAND.

TOOLMAKER'S CLAMP.

Application filed November 3, 1927. Serial No. 230,748.

This invention relates to certain new and useful improvements in tool makers' clamps and the primary object thereof is to provide a clamp which can be adjusted so as to vary the relation of the free or effective ends of the clamp thereby to enable the work to be securely clamped to the block during operation thereon by the tool maker.

A further object of the invention is to provide a clamp in which same is securely held in position and against rocking or other movement upon adjustment of the jaws to vary the relation of the free ends thereof.

In the drawings:—

Figure 1 is a side elevation of the invention showing the manner of use thereof in clamping work to a tool maker's block, and Figure 2 is a top plan view of Fig. 1.

In proceeding in accordance with the present invention, a pair of jaws 1 and 2 are employed, the jaw 1 being of greater length than the jaw 2 as shown in Figure 1.

The jaw 1 has a screw 3 threaded through a opening 4 provided therefor and through an opening 5 in the jaw 2. The jaw 2 has a similar screw 6 threaded through an opening 7, provided therefor in the jaw and has its free end 8 freely rotatable in a socket 9 provided therefor in the jaw 1. The jaw 1 is provided with a socket 10 similar to the socket 9 and which is located between the socket 9 and the opening 4. The jaw 1 in addition has a threaded opening 11 in which a screw 12 is threadedly engaged. The screws 3, 6 and 12 are provided with knurled heads 13, 14 and 15 respectively.

The tool maker's block is shown at B in the drawings and has overhanging flanges C and C' at its sides and a central cut-out D. The work W is placed on the top face of the block and in the instance of where same is of less width or length than the distance between the flanges C, the work is moved to a line with the outer edge of one of the flanges C and is clamped as shown to the right of Figure 1. With work of this length or width, the opposite edge thereof is, as shown to the left of Figure 1, considerably spaced inwardly from the flange C', and in such event the jaws are adjusted so that the free end of the jaw 1 is extended beyond the free end of the jaw 2 whereby the free end of the jaw 1 is engaged through a substantial portion with the adjacent part of the work. In adjusting the jaws from the position to the right of Figure 1 to that shown to the left, it will be noted that it is merely necessary to remove the screw 3 and disengage the screw 6 from the socket 10 and to then move the jaw 1 to the left, whereupon the screw 3 is threaded through the opening 5 and the end 8 of the screw 6 is inserted in the socket 9. The jaws are then related as shown to the left of Figure 1 and in order to provide an additional fulcrum point for the free end of the jaw 1, screw 12 is threaded through the opening 11 and has its free end engaged with the flange C', thus steadying the jaw 1 and more securely clamping the work.

From the foregoing it will be apparent that the clamp can be easily and quickly adjusted, as occasion requires, to vary the relationship between the effective or clamping ends of the jaws, and in the instance of causing one jaw end to project beyond the other, the bearing screw 12 can be easily applied and as easily removed when the jaw ends are used in their aligned state.

Having thus described my invention, what I claim as new and desire to secure by Letters Patent is:—

1. In a tool maker's clamp, a pair of jaws of varying lengths one having a pair of sockets and an inner and an outer threaded opening and the other having three threaded openings, a screw threaded through one of the openings of said second named jaw and being receivable in either of the sockets of the first named jaw, a screw threaded through the inner opening of the first named jaw and being receivable in either of the remaining two openings of the second named jaw, and a screw threaded through the outer opening of the first named jaw and being formed to engage with a tool maker's block to steady the first named jaw.

2. In a tool maker's clamp, a pair of jaws of varying lengths, one having a pair of sockets and a threaded opening and the other having three threaded openings, a screw threaded through one of the openings of the second named jaw and being receivable in a selected one of the sockets of the first named jaw, and a screw threaded through the threaded opening of the first named jaw and into a selected one of the two remaining openings of the second named jaw.

3. In a clamp, a pair of jaws, a screw carried by each jaw and disposed at right angles thereto and to the opposite jaw and engaging the latter, and means whereby to enable adjustment of the jaws so as to cause one of the jaws to have its clamping end project beyond the corresponding end of the other jaw while maintaining said right angular relation of the screws to the jaws.

4. In a clamp, a pair of jaws, a screw carried by each jaw and engaging the opposite jaw, means whereby to enable adjustment of the jaws so as to cause one of the jaws to have its clamping end project beyond the corresponding end of the other jaw, and removable means carried by the outer part of the said projecting end of the said jaw to engage a support to steady the jaw.

5. In a clamp, a pair of jaws, and a screw carried by each jaw and disposed at right angles thereto and to the opposite jaw and engaging the latter, said jaws being formed to engage each of the screws in a second position thereof thereby to cause the clamping end of one of the jaws to project beyond the clamping end of the other jaw while maintaining said right angular relation of the screws to the jaws.

6. In a clamp, a pair of jaws, means having a right angular relation to the jaws to move the jaws into and out of clamping position, and means whereby to cause the clamping end of one jaw to project beyond the clamping end of the other jaw while maintaining said right angular relation of the first named means to the jaws 7. In a clamp, a pair of jaws, means having a right angular relation to the jaws to move the jaws into and out of clamping position, means whereby to cause the clamping end of one jaw to project beyond the clamping end of the other jaw while maintaining said right angular relation of the first named means to the jaws, and means carried by said projecting end of said jaw to steady same.

In testimony whereof I have hereunto signed my name.

MALCOLM K. PARKHURST.